US010269472B2

(12) United States Patent
Yabe et al.

(10) Patent No.: US 10,269,472 B2
(45) Date of Patent: Apr. 23, 2019

(54) HEAT-SHRINKABLE TUBE, HEAT-SHRINKABLE CAP, AND METHOD OF WATERPROOFING ELECTRICAL WIRE BUNDLE

(71) Applicants: SUMITOMO ELECTRIC FINE POLYMER, INC., Sennan-gun, Osaka (JP); SUMITOMO ELECTRIC INDUSTRIES, LTD., Osaka-shi, Osaka (JP)

(72) Inventors: Yuuki Yabe, Osaka (JP); Ryohei Fujita, Osaka (JP); Ryota Fukumoto, Osaka (JP); Satoshi Yamasaki, Osaka (JP); Shinya Nishikawa, Osaka (JP)

(73) Assignees: SUMITOMO ELECTRIC FINE POLYMER, INC., Sennan-gun, Osaka (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 292 days.

(21) Appl. No.: 15/316,538

(22) PCT Filed: Jul. 7, 2015

(86) PCT No.: PCT/JP2015/069561
§ 371 (c)(1),
(2) Date: Dec. 6, 2016

(87) PCT Pub. No.: WO2016/009904
PCT Pub. Date: Jan. 21, 2016

(65) Prior Publication Data
US 2017/0200536 A1    Jul. 13, 2017

(30) Foreign Application Priority Data

Jul. 15, 2014    (JP) .................................. 2014-145096

(51) Int. Cl.
*H01B 13/22* (2006.01)
*H01B 7/282* (2006.01)
(Continued)

(52) U.S. Cl.
CPC ............. *H01B 13/228* (2013.01); *B32B 1/08* (2013.01); *B32B 3/20* (2013.01); *B32B 7/02* (2013.01);
(Continued)

(58) Field of Classification Search
CPC .. H01B 13/228; H01B 7/0009; H01B 7/2825; B32B 7/02; B32B 7/12; B32B 1/08;
(Continued)

(56) References Cited

U.S. PATENT DOCUMENTS

2015/0004408 A1 *   1/2015   Yamasaki ................... C09J 7/35
                                                              428/355 EN

FOREIGN PATENT DOCUMENTS

EP          0965627 A1 *   12/1999
JP          S60-187041 U    12/1985
(Continued)

OTHER PUBLICATIONS

Office Action dated Nov. 9, 2018 that issued in U.S. Appl. No. 15/325,726.

*Primary Examiner* — Michael C Miggins
(74) *Attorney, Agent, or Firm* — Drinker Biddle & Reath LLP (57) ABSTRACT

A heat-shrinkable tube or heat-shrinkable cap includes an adhesive layer disposed on the inner surface thereof, the adhesive layer including a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature. The heat-shrinkable (Continued)

tube or heat-shrinkable cap is used for waterproofing an exposed portion of electrical wires of an electrical wire bundle such as a wire harness, in which merely by placing the heat-shrinkable tube or heat-shrinkable cap over the exposed portion of electrical wires, waterproofing and water blocking between strands can be achieved, and outflow of the resin during heat shrinking does not occur. A method of waterproofing an electrical wire bundle uses the heat-shrinkable tube or heat-shrinkable cap.

8 Claims, 3 Drawing Sheets

(51) Int. Cl.

| | | |
|---|---|---|
| *B32B 7/02* | (2019.01) | |
| *B32B 7/12* | (2006.01) | |
| *B32B 1/08* | (2006.01) | |
| *H02G 15/04* | (2006.01) | |
| *C09J 123/06* | (2006.01) | |
| *C09J 123/08* | (2006.01) | |
| *C09J 177/00* | (2006.01) | |
| *H01B 7/00* | (2006.01) | |
| *H02G 3/04* | (2006.01) | |
| *B32B 27/08* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 3/20* | (2006.01) | |
| *B32B 7/05* | (2019.01) | |
| *C09J 201/00* | (2006.01) | |

(52) U.S. Cl.
CPC .................. *B32B 7/05* (2019.01); *B32B 7/12* (2013.01); *B32B 27/08* (2013.01); *B32B 27/306* (2013.01); *B32B 27/32* (2013.01); *B32B 27/34* (2013.01); *B32B 27/36* (2013.01); *C09J 123/06* (2013.01); *C09J 123/0853* (2013.01); *C09J 177/00* (2013.01); *H01B 7/0009* (2013.01); *H01B 7/2825* (2013.01); *H02G 3/0412* (2013.01); *H02G 15/04* (2013.01); *B32B 2250/24* (2013.01); *B32B 2250/44* (2013.01); *B32B 2307/206* (2013.01); *B32B 2307/70* (2013.01); *B32B 2307/7265* (2013.01); *B32B 2307/732* (2013.01); *B32B 2307/736* (2013.01); *B32B 2597/00* (2013.01); *B32B 2605/00* (2013.01); *C09J 201/00* (2013.01); *C09J 2203/302* (2013.01); *C09J 2423/00* (2013.01); *C09J 2431/00* (2013.01); *C09J 2477/00* (2013.01)

(58) Field of Classification Search
CPC ....... B32B 27/08; B32B 27/306; B32B 27/32; B32B 27/34; B32B 27/36; B32B 3/20; B32B 7/05; B32B 2250/24; B32B 2250/44; B32B 2307/206; B32B 2307/70; B32B 2307/7265; B32B 2307/732; B32B 2307/736; B32B 2597/00; B32B 2605/00; H02G 15/04; H02G 3/0412; C09J 123/06; C09J 123/0853; C09J 177/00; C09J 201/00; C09J 2203/302; C09J 2423/00; C09J 2431/00; C09J 2477/00
See application file for complete search history.

(56) References Cited

FOREIGN PATENT DOCUMENTS

| | | |
|---|---|---|
| JP | H11-233175 A | 8/1999 |
| JP | 2009-099385 A | 5/2009 |
| WO | WO 2013/073715 A1 | 5/2013 |
| WO | WO-2014/054409 A1 | 4/2014 |
| WO | WO-2014/097695 A1 | 6/2014 |

* cited by examiner

HEAT-SHRINKABLE TUBE, HEAT-SHRINKABLE CAP, AND METHOD OF WATERPROOFING ELECTRICAL WIRE BUNDLE

TECHNICAL FIELD

The present invention relates to a heat-shrinkable tube or heat-shrinkable cap which is used, for example, to waterproof an electrical wire bundle in which a plurality of insulated electrical wires are bundled together, such as a wire harness for automobile and motorcycle use. The present invention also relates to a method of waterproofing the electrical wire bundle using the heat-shrinkable tube or heat-shrinkable cap.

BACKGROUND ART

A wire harness for automobile and motorcycle use is formed by binding together a plurality of insulated electrical wires with a cable tie, adhesive tape, or the like. In each insulated electrical wire, a bundle of strands (usually a plurality of strands) made of a conductor such as a copper alloy is covered with insulation. Strands are exposed at a connecting portion (joint) located at the end or middle of an electrical wire bundle, such as a wire harness, and in order to waterproof such a portion, a heat-shrinkable tube or heat-shrinkable cap having a hot-melt adhesive (inner-layer adhesive) layer formed on the inner surface thereof is used. Waterproofing is achieved by placing the heat-shrinkable tube or heat-shrinkable cap over the connecting portion, followed by heat shrinking.

In waterproofing a wire harness, it is required to prevent entry of water from the outside into a connecting portion, and it is also required to block entry of water into the internal interstices between strands (perform water blocking between strands) so that water that has entered from a portion that has not been subjected to waterproof treatment can be prevented from flowing inside the insulated electrical wires in many cases. The reason for this is that water flows in the interior of the electrical wires and may even enter important equipment. However, since the inner-layer adhesive used in the existing heat-shrinkable tube or heat-shrinkable cap has a high viscosity, a process of simply placing and shrinking the heat-shrinkable tube or cap does not cause the inner-layer adhesive to penetrate the interstices between strands, and it is not possible to achieve sufficient water blocking ability between strands (property of blocking entry of water between strands).

Accordingly, in order to achieve sufficient water blocking ability between strands, in existing techniques, before shrinking a heat-shrinkable tube or cap, an operation is performed, such as immersing a connecting portion in a low-viscosity adhesive, or impregnating the interstices between strands in a connecting portion with a thermosetting resin such as an epoxy resin, followed by curing. For example, PTL 1 describes a waterproof structure at a terminal of electrical wires in which a cyano adhesive is made to penetrate and solidify in the interstices between core wires at the terminal of electrical wires, thereby bonding the core wires to each other; moreover, a heat-shrinkable tube having a hot-melt layer (adhesion layer) formed on the inner surface thereof is placed over the terminal, and the hot-melt layer is melted and solidified to perform filling. Furthermore, PTL 2 discloses a water blocking method for a joint electrical wire including a water-blocking material supply step of causing a liquid water-blocking material having a thermosetting property to adhere to a terminal core wire portion at which electrical wires are exposed, and causing the water-blocking material to penetrate the interstices between the core wires; a water-blocking material curing step of curing the water-blocking material with heat generated by resistance welding; and a step of performing water blocking between wires in which a heat-shrinkable cap having a hot-melt applied to the inner surface thereof is placed over the terminal of the coated electrical wires, the heat-shrinkable cap is shrunk by heating, and the hot-melt is made to penetrate the interstices between the coated electrical wires to perform water blocking between the coated electrical wires.

CITATION LIST

Patent Literature

PTL 1: Japanese Unexamined Patent Application Publication No. 11-233175
PTL 2: Japanese Unexamined Patent Application Publication No. 2009-99385

SUMMARY OF INVENTION

Technical Problem

In order to achieve water blocking between strands using the existing techniques, at least two operations are required: an operation for performing water blocking between strands and an operation of placing and shrinking a heat-shrinkable tube or cap. This gives rise to a productivity problem. Accordingly, it has been desired to develop a heat-shrinkable tube or cap in which exterior waterproofing of insulated electrical wires and sufficient water blocking between strands can be achieved merely by an operation of placing and shrinking the heat-shrinkable tube or cap.

As a method for achieving sufficient water blocking between strands merely by an operation of placing and shrinking a heat-shrinkable tube or cap, it is conceivable to use an inner-layer adhesive having a low viscosity such that the inner-layer adhesive can penetrate the interstices between strands during heat shrinking. However, when an inner-layer adhesive having a low viscosity is used for a heat-shrinkable tube or cap, a problem may result in which the inner-layer adhesive protrudes (outflows) from the inside of the heat-shrinkable tube or cap during heat shrinking.

It is an object of the present invention to provide a heat-shrinkable tube or heat-shrinkable cap which can be used for waterproofing an exposed portion of electrical wires (a portion to be waterproofed, such as a connecting portion) of an electrical wire bundle formed by bundling together a plurality of electrical wires, each electrical wire including a plurality of strands covered with insulation, such as a wire harness for automobile use, and in which, merely by an operation of placing the heat-shrinkable tube or heat-shrinkable cap over the portion to be waterproofed, followed by shrinking, waterproofing and water blocking between strands can be achieved, and outflow (protrusion) of a resin during the shrinking (waterproofing step) can be suppressed.

It is another object of the present invention to provide a method of waterproofing an electrical wire bundle in which merely by placing a heat-shrinkable tube or heat-shrinkable cap over an exposed portion of electrical wires, followed by heat shrinking, waterproofing of the exposed portion of electrical wires and water blocking between strands can be achieved, and outflow (protrusion) of a resin during the waterproofing step can be suppressed.

Solution to Problem

A first embodiment of the present invention is a heat-shrinkable tube or heat-shrinkable cap including an adhesive layer disposed on the inner surface thereof. The adhesive layer includes a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature.

A second embodiment of the present invention is a heat-shrinkable tube or heat-shrinkable cap including an adhesive layer disposed on the inner surface thereof. The adhesive layer includes a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature, and a high-viscosity adhesive layer formed of a resin having a viscosity of 200 Pa·s or more at a shear rate of 1 s$^{-1}$ at the heat shrinkage temperature. In the case of the heat-shrinkable tube, the high-viscosity adhesive layer is provided on both sides of the low-viscosity adhesive layer, and in the case of the heat-shrinkable cap, the high-viscosity adhesive layer is provided at least on the heat-shrinkable cap opening side of the low-viscosity adhesive layer.

A third embodiment of the present invention is a method of waterproofing an electrical wire bundle in which a plurality of electrical wires are bundled together, each electrical wire including a bundle of a plurality of strands covered with insulation, the method including a step of placing a heat-shrinkable tube or heat-shrinkable cap over an exposed portion of electrical wires of the electrical wire bundle, followed by heat-shrinking the heat-shrinkable tube or heat-shrinkable cap. The heat-shrinkable tube or heat-shrinkable cap includes an adhesive layer disposed on the inner surface thereof. The adhesive layer includes a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature, and a high-viscosity adhesive layer formed of a resin having a viscosity of 200 Pa·s or more at a shear rate of 1 s$^{-1}$ at the heat shrinkage temperature. In the case of the heat-shrinkable tube, the high-viscosity adhesive layer is provided on both sides of the low-viscosity adhesive layer, and in the case of the heat-shrinkable cap, the high-viscosity adhesive layer is provided at least on the heat-shrinkable cap opening side of the low-viscosity adhesive layer.

Advantageous Effects of Invention

According to the first and second embodiments of the present invention, it is possible to provide a heat-shrinkable tube or heat-shrinkable cap in which, merely by placing the heat-shrinkable tube or heat-shrinkable cap over an exposed portion of electrical wires of an electrical wire bundle, i.e., the portion to be waterproofed, followed by heat shrinking, waterproofing of the exposed portion of electrical wires and water blocking between strands can be achieved, and outflow (protrusion) of a resin during heat shrinking can be suppressed.

In the waterproof method according to the third embodiment of the present invention, merely by placing a heat-shrinkable tube or heat-shrinkable cap over an exposed portion of electrical wires of an electrical wire bundle, i.e., the portion to be waterproofed, followed by heat shrinking, waterproofing of the exposed portion of electrical wires of the electrical wire bundle and water blocking between strands can be achieved, and outflow (protrusion) of a resin during heat shrinking can be suppressed. Therefore, this waterproof method has high productivity and can be suitably used in waterproofing joints of wire harnesses for automobile use and the like.

DESCRIPTION OF EMBODIMENTS

With respect to the first to third embodiments, embodiments of the present invention will be described below. However, it is to be understood that the first to third embodiments are not limited to the embodiments and examples shown below, but include all modifications within the meaning and scope equivalent to those of the claims.

(Heat-Shrinkable Tube or Heat-Shrinkable Cap According to First Embodiment)

The present inventors have performed thorough studies in order to solve the problems described above in the method of waterproofing an electrical wire bundle using the existing heat-shrinkable tube or cap. As a result, it has been found that, by forming an inner adhesive layer using a resin whose viscosity is low at the temperature during heat shrinking (heat shrinkage temperature) so that the resin can easily penetrate the interstices between strands and whose viscosity markedly increases at a temperature lower than the heat shrinkage temperature, it is possible to obtain a heat-shrinkable tube or cap in which, merely by placing the heat-shrinkable tube or cap over a portion to be waterproofed, followed by heat shrinking, waterproofing of an exposed portion of electrical wires and water blocking between strands can be achieved, and outflow (protrusion) of the resin during heat shrinking can be suppressed. Thus, a first embodiment of the invention has been accomplished.

The first embodiment of the present invention is a heat-shrinkable tube or heat-shrinkable cap including an adhesive layer disposed on the inner surface thereof. The adhesive layer includes a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature.

In the heat-shrinkable tube or heat-shrinkable cap according to the first embodiment, an adhesive layer is provided in contact with the inner surface thereof (corresponding to the inner adhesive layer in the existing heat-shrinkable tube or heat-shrinkable cap). The first embodiment is characterized in that the adhesive layer includes the low-viscosity adhesive layer.

The heat shrinkage temperature is a temperature at which heating is performed to heat-shrink the heat-shrinkable tube or heat-shrinkable cap. Since the resin constituting the low-viscosity adhesive layer has a low viscosity of 10 Pa·s or less at a shear rate of 1 s$^{-1}$ at the heat shrinkage temperature, the resin can flow and penetrate the interstices between strands during heat shrinking, and it is possible to achieve excellent water blocking ability between strands. Note that as the flowability of the resin constituting the low-viscosity adhesive layer during heat shrinking increases, the resin becomes more likely to penetrate the interstices between strands. Accordingly, the viscosity at a shear rate of 1 s$^{-1}$ during heat shrinking is preferably 2 Pa·s or less and more preferably 1 Pa·s or less.

On the other hand, the resin constituting the low-viscosity adhesive layer is preferably a resin which has a high viscosity such that sufficient water blocking ability between strands can be obtained (or a resin which is solidified) at a temperature lower than the heat shrinkage temperature, e.g., at the temperature at which the water-blocked electrical wire bundle is used. That is, in order to maintain sufficient water blocking ability between strands during use of the electrical wire bundle, it is desired that the inner-layer adhesive does not flow when cooled after heat shrinking and the adhesive is solidified or has a high viscosity at the temperature during use of the electrical wire bundle. In the case where the resin constituting the low-viscosity adhesive layer has a low viscosity even when cooled after heat shrinking, the resin that has penetrated the interstices between strands is likely to flow during use of the electrical wire bundle, and water blocking ability between strands is unlikely to be maintained. Furthermore, in the case where the resin has a low viscosity at a temperature lower than the heat shrinkage temperature, in particular, at room temperature, the shape of the low-viscosity adhesive layer is unlikely to be retained during storage of the heat-shrinkable tube or cap, which is also a problem.

Since the resin constituting the low-viscosity adhesive layer has a viscosity of 100 Pa·s or more at a shear rate of 1 s$^{-1}$ at the maximum continuous use temperature, the flowability of the inner-layer adhesive decreases when cooled after heat shrinking, the adhesive is solidified or has a high viscosity at the temperature during use of the electrical wire bundle, and outflow (protrusion) of the resin during use after heat shrinking can be suppressed.

Because of the viscosity characteristics of the resin constituting the low-viscosity adhesive layer, it is possible to provide a heat-shrinkable tube or heat-shrinkable cap in which, merely by placing the heat-shrinkable tube or heat-shrinkable cap over an exposed portion of electrical wires of an electrical wire bundle, i.e., the portion to be waterproofed, followed by heat shrinking, waterproofing of the exposed portion of electrical wires and water blocking between strands can be achieved, and outflow (protrusion) of the resin during heat shrinking does not occur. As is obvious from the viscosity of the resin described above, the maximum continuous use temperature is lower than the heat shrinkage temperature.

The viscosity at a shear rate of 1 s$^{-1}$ is measured using a rotary rheometer. Specifically, the viscosity is the value measured using a rotary rheometer ("MCR302" manufactured by Anton Paar Company) with a PP-12 jig at a predetermined heat shrinkage temperature (e.g., 150° C.). The shear rate is determined by the shape of a rotator and the rotational speed, and the rotary rheometer is configured to automatically set the shear rate.

In the first embodiment, the resin constituting the low-viscosity adhesive layer is preferably an adhesive resin having adhesion to strands which are adherends.

The resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature can be selected from various resins, and its type is not particularly limited. In many cases, the heat shrinkage temperature used is about 150° C. Specific examples of the resin that can be suitably used when the heat shrinkage temperature is about 150° C. include a polyamide resin and an ethylene-vinyl acetate copolymer (EVA). Accordingly, a preferred embodiment of the first embodiment provides a heat-shrinkable tube or heat-shrinkable cap in which the low-viscosity adhesive layer is composed mainly of a polyamide resin or EVA that solidifies at a temperature lower than the heat shrinkage temperature. The expression "is composed mainly of a polyamide resin or EVA" means that the polyamide resin or EVA occupies the major portion, the content thereof being at least 50% by mass or more, and preferably 80% to 100% by mass, and other resins may be used in combination within a range that does not depart from the spirit and scope of the present invention. A heat-shrinkable tube whose heat shrinkage temperature is about 150° C. is often used in a high-temperature atmosphere, and the maximum continuous use temperature is usually about 125° C. In the case of a heat-shrinkable tube which is used in a lower-temperature atmosphere, for example, at a maximum continuous use temperature of about 80° C., the heat shrinkage temperature is usually about 125° C.

(Heat-Shrinkable Tube or Heat-Shrinkable Cap According to Second Embodiment)

The second embodiment of the present invention is a heat-shrinkable tube or heat-shrinkable cap including an adhesive layer disposed on the inner surface thereof. The adhesive layer includes a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature, and a high-viscosity adhesive layer formed of a resin having a viscosity of 200 Pa·s or more at a shear rate of 1 s$^{-1}$ at the heat shrinkage temperature. In the case of the heat-shrinkable tube, the high-viscosity adhesive layer is provided on both sides of the low-viscosity adhesive layer, and in the case of the heat-shrinkable cap, the high-viscosity adhesive layer is provided at least on the heat-shrinkable cap opening side of the low-viscosity adhesive layer.

The low-viscosity adhesive layer in the second embodiment of the present invention is the same as the low-viscosity adhesive layer in the first embodiment. Accordingly, the description and explanation of the low-viscosity adhesive layer in the first embodiment also apply to the low-viscosity adhesive layer in the second embodiment.

The heat-shrinkable tube or heat-shrinkable cap according to the second embodiment is characterized in that the high-viscosity adhesive layer formed of a resin having a viscosity of 200 Pa·s or more at a shear rate of 1 s$^{-1}$ at the heat shrinkage temperature is provided on both sides of the low-viscosity adhesive layer in the case of the heat-shrinkable tube, and the high-viscosity adhesive layer is provided at least on the heat-shrinkable cap opening side of the low-viscosity adhesive layer in the case of the heat-shrinkable cap.

The present inventors have found that, by forming a low-viscosity adhesive layer using a resin whose viscosity is low at the heat shrinkage temperature so that the resin can easily penetrate the interstices between strands (as in the first embodiment) and by including a high-viscosity adhesive layer (dam material) that prevents outflow during heat shrinking in the adhesive layer, it is possible to further suppress outflow (protrusion) of the resin constituting the low-viscosity adhesive layer during heat shrinking. It has been found that, merely by placing a heat-shrinkable tube or heat-shrinkable cap including the low-viscosity adhesive layer and the high-viscosity adhesive layer over an exposed portion of electrical wires, followed by heat shrinking, waterproofing of the exposed portion of electrical wires and water blocking between strands can be performed, and outflow (protrusion) of the resin during heat shrinking can be further suppressed. Thus, the second embodiment and the third embodiment, which will be described later, of the invention have been accomplished.

As described above, the adhesive layer of the heat-shrinkable tube or heat-shrinkable cap according to the second embodiment is characterized by including a low-viscosity adhesive layer and a high-viscosity adhesive layer. When the amount of the resin constituting the low-viscosity adhesive layer is excessively small, it is difficult to achieve sufficient water blocking ability between strands. On the other hand, when the amount of the resin is excessively large, it is difficult to prevent outflow (protrusion) of the resin during heat shrinking even by means of the high-viscosity adhesive layer. Accordingly, the amount of the resin of the low-viscosity adhesive layer (the thickness of the layer and the length in the direction in which the tube extends) is preferably selected from a range required for achieving sufficient water blocking ability between strands and capable of preventing outflow (protrusion) of the resin.

High-Viscosity Adhesive Layer

Since the high-viscosity adhesive layer has a viscosity of 200 Pa·s or more (shear rate $1\ s^{-1}$) during heat shrinking (when the heat shrinkage temperature is reached), the shape of the resin layer is retained during heat shrinking. More preferably, the high-viscosity adhesive layer has a viscosity of 400 Pa·s or more at a shear rate of $1\ s^{-1}$ during heat shrinking. For example, in the case where a heat shrinkage temperature of 150° C. is used, the viscosity (shear rate $1\ s^{-1}$) at 150° C. is 200 Pa·s or more, and preferably, the viscosity (shear rate $1\ s^{-1}$) at 150° C. is 400 Pa·s or more.

During heat shrinking, the resin constituting the low-viscosity adhesive layer has a low viscosity and flows, whereas the high-viscosity adhesive layer retains its shape even during heat shrinking and plays a role of preventing the resin constituting the low-viscosity adhesive layer from overflowing from the high-viscosity adhesive layer to the outside (the role of a kind of dam; thus referred to as the "dam material"). Consequently, the high-viscosity adhesive layer is provided at the position where it can prevent the resin constituting the low-viscosity adhesive layer from overflowing to the outside of the tube during heat shrinking. That is, in the case of a heat-shrinkable tube having openings on both sides, the high-viscosity adhesive layer is provided outside both ends of the low-viscosity adhesive layer so that the resin constituting the low-viscosity adhesive layer can be prevented from outflowing toward the tube opening sides. In the case of a heat-shrinkable cap, since one end is closed, the high-viscosity adhesive layer may be provided outside the end of the opening side of the low-viscosity adhesive layer (on the cap opening side) only. (However, there may be a case where one end of a heat-shrinkable cap is closed by the high-viscosity adhesive layer, and in such a case, the high-viscosity adhesive layer is provided on both sides of the low-viscosity adhesive layer.)

The high-viscosity adhesive layer may not be necessarily provided in contact with the end of the low-viscosity adhesive layer. In order to prevent outflow (protrusion) of the low-viscosity adhesive layer during heat shrinking, it is preferable that there be a space between the high-viscosity adhesive layer and the end of the low-viscosity adhesive layer. In this case, during heat shrinking, the resin of the low-viscosity adhesive layer flows and fills the space entirely or partially.

The high-viscosity adhesive layer desirably has a size (thickness/length in the direction in which the tube extends) that can sufficiently prevent outflow of the low-viscosity adhesive layer during heat shrinking. The resin constituting the high-viscosity adhesive layer is specifically a resin composed mainly of a polyethylene or another polyolefin-based resin, a thermoplastic polyester resin, EVA, a polyamide resin, or the like, the resin having a viscosity of 200 Pa·s or more, preferably 400 Pa·s or more, at a shear rate of $1\ s^{-1}$ during heat shrinking. Among these, a polyethylene and EVA are preferable. Accordingly, a preferred embodiment of the second embodiment provides a heat-shrinkable tube or heat-shrinkable cap in which the high-viscosity adhesive layer is formed of a resin composed mainly of a polyamide resin or EVA and having a viscosity of 400 Pa·s or more at a shear rate of $1\ s^{-1}$ during heat shrinking.

The heat-shrinkable tube or heat-shrinkable cap according to the second embodiment can be obtained by forming a low-viscosity adhesive layer, by the same method as that for forming a known inner adhesive layer, on the inner surface of a heat-shrinkable tube or heat-shrinkable cap, which is produced in the same manner as that of a known heat-shrinkable tube or heat-shrinkable cap, and then forming a high-viscosity adhesive layer on the end of the low-viscosity adhesive layer (on both ends in the case of the heat-shrinkable tube, and may be on the end on the opening side only in the case of the heat-shrinkable cap). The high-viscosity adhesive layer can be formed by a method in which a ring in the shape of the high-viscosity adhesive layer is separately formed in advance and inserted to a predetermined position.

Heat-Shrinkable Tube and Heat-Shrinkable Cap

The heat-shrinkable tube in the first and second embodiments refers to a tube that has a property of being shrunk in the radial direction by heating in which both ends are usually open, and is used, for example, to waterproof an exposed portion of electrical wires located at the end or the like of a wire harness. The heat-shrinkable cap refers to a heat-shrinkable tube in which one end has been closed by heat shrinking or the like, and is used, for example, to waterproof an exposed portion of electrical wires located at the end of a wire harness.

The heat-shrinkable tube and the heat-shrinkable cap in the first and second embodiments can be formed using the same resins as those of existing heat-shrinkable tubes for portions other than the inner adhesive layer (low-viscosity adhesive layer and high-viscosity adhesive layer) and can be produced by the same method. For example, a linear polyolefin polymer is formed into a tubular shape with a melt extruder or the like, the resin is crosslinked by irradiation with ionizing radiation or the like, and then the diameter of the tube is expanded, for example, by a method of introducing compressed air into the tube, followed by cooling to fix the shape. In such a manner, a resin tube having heat shrinkability can be produced. The heat-shrinkable cap can be produced by closing one end of the heat-shrinkable tube produced as described above by heat shrinking or the like.

The heat-shrinkable tube and the heat-shrinkable cap according to the second embodiment and waterproofing of a wire harness using them will be described below with reference to the drawings. Note that the heat-shrinkable tube or cap according to the first embodiment and water blocking between strands using the heat-shrinkable tube or cap correspond to the case where a high-viscosity adhesive layer is not formed in the heat-shrinkable tube or cap according to the second embodiment described below, and the following description also applies to portions not related to the high-viscosity adhesive layer in the first embodiment.

Figure 1:
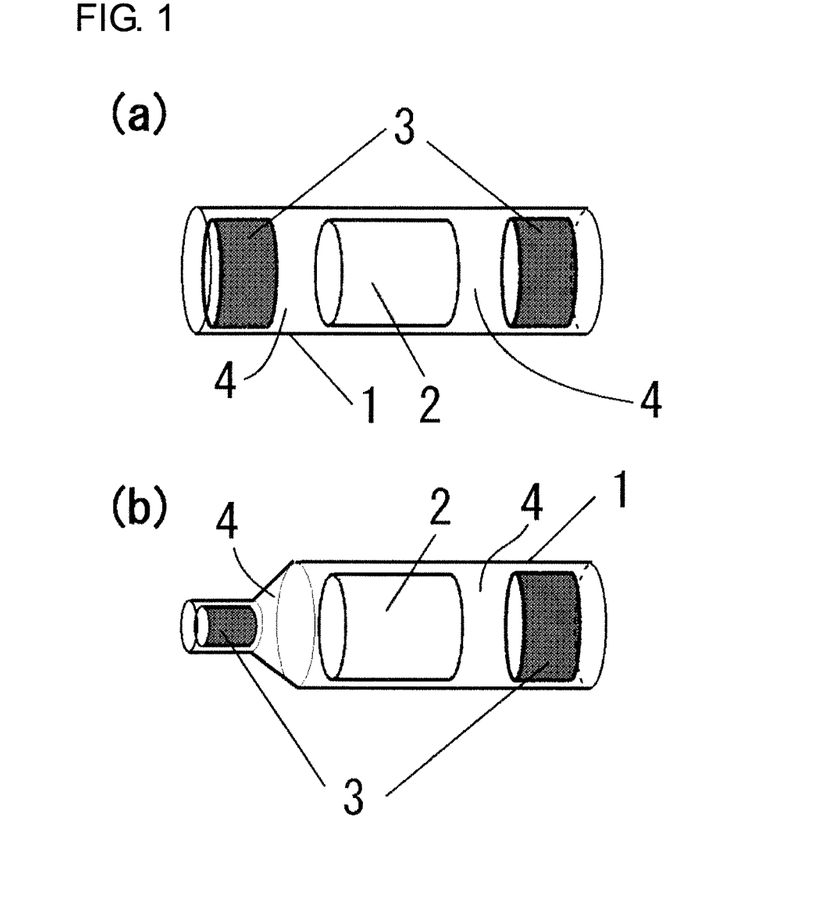
FIG. 1 includes schematic perspective views showing a heat-shrinkable tube and a heat-shrinkable cap according to a second embodiment.

FIG. 1(a) is a schematic perspective view showing a heat-shrinkable tube according to the second embodiment, and FIG. 1(b) is a schematic perspective view showing a heat-shrinkable cap according to the second embodiment, each showing the state before heat shrinking. In FIGS. 1(a) and 1(b), reference sign 1 denotes a heat-shrinkable tube or heat-shrinkable cap, reference sign 2 denotes a low-viscosity adhesive layer, and reference sign 3 denotes a high-viscosity adhesive layer. In the heat-shrinkable tube shown in FIG. 1(a), the high-viscosity adhesive layer 3 is provided on both sides of the low-viscosity adhesive layer 2. In the heat-shrinkable cap shown in FIG. 1(b), the high-viscosity adhesive layer 3 is provided on the cap opening side of the low-viscosity adhesive layer 2, and the other end is closed with a resin constituting the high-viscosity adhesive layer 3. In each case, a space 4 (a portion having no adhesive layer formed therein) is provided between the high-viscosity adhesive layer 3 and the low-viscosity adhesive layer 2. Note that the heat-shrinkable cap shown in FIG. 1(b) is obtained by heat-shrinking one end of a heat-shrinkable tube shown in FIG. 1(a).

Figure 2:
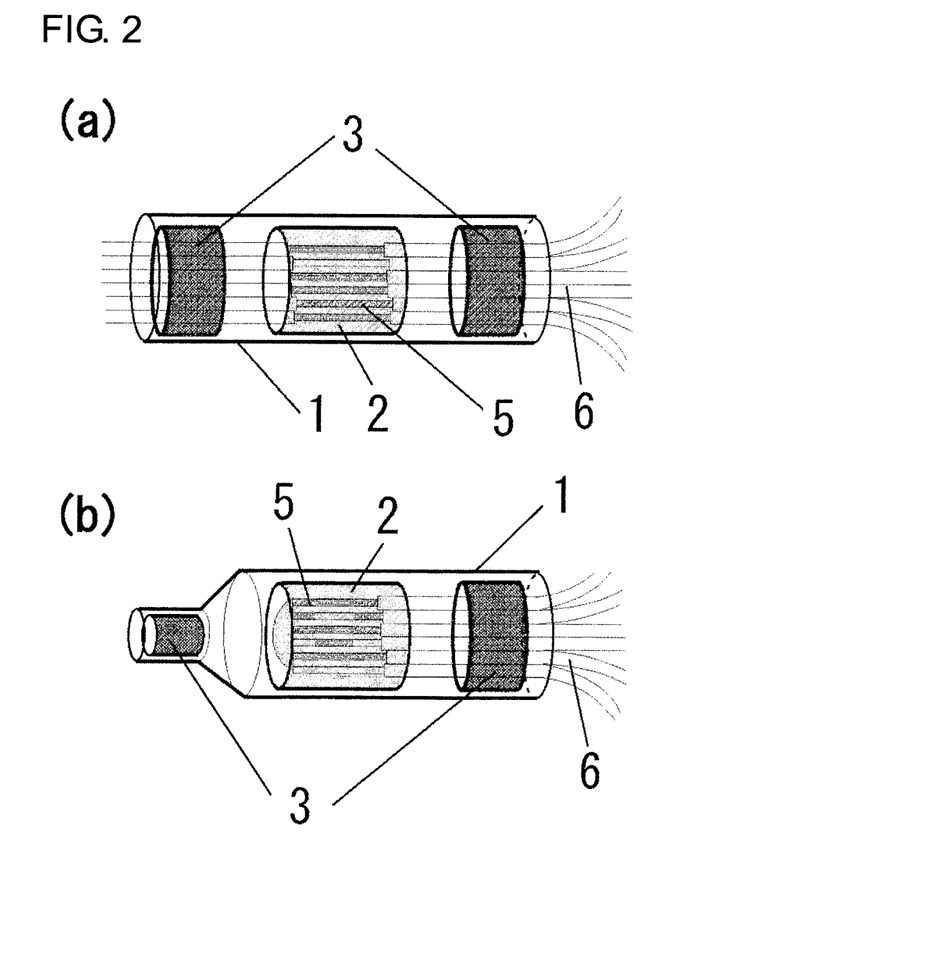
FIG. 2 includes schematic perspective views showing the state in which a wire harness having an exposed portion of electrical wires is inserted into the heat-shrinkable tube or heat-shrinkable cap according to the second embodiment.

FIG. 2(a) is a schematic perspective view showing the state in which a wire harness having an exposed portion of electrical wires in the middle thereof is inserted into the heat-shrinkable tube according to the second embodiment. FIG. 2(b) is a schematic perspective view showing the state in which an end of a wire harness having an exposed portion of electrical wires at the end is inserted into the heat-shrinkable cap according to the second embodiment. In FIGS. 2(a) and 2(b), reference sign 6 denotes a wire harness and reference sign 5 denotes an exposed portion of electrical wires (portion to be waterproofed).

Figure 3:
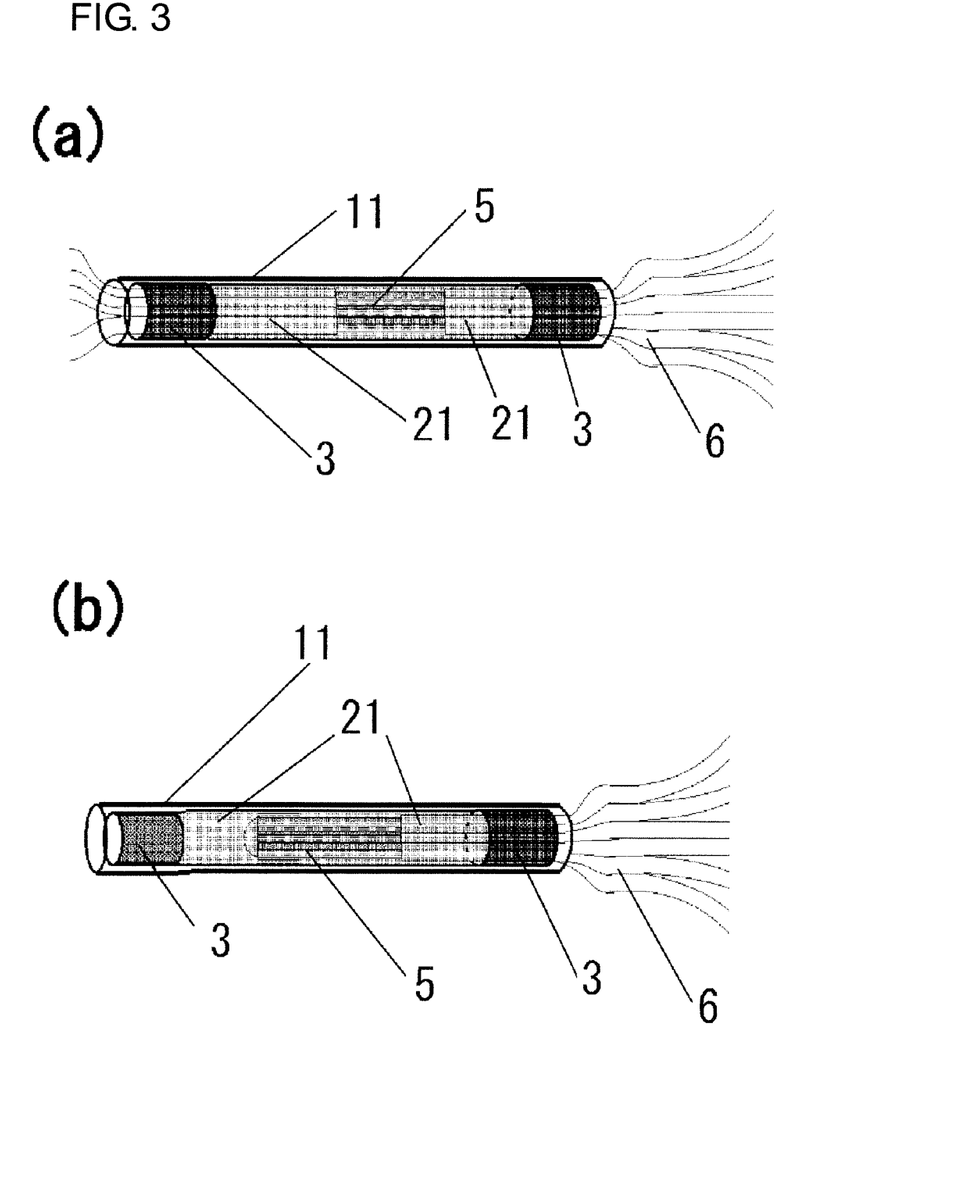
FIG. 3 includes schematic perspective views showing the state in which, after a wire harness having an exposed portion of electrical wires has been inserted into the heat-shrinkable tube or heat-shrinkable cap according to the second embodiment, the tube is heated and heat-shrunk.

As shown in FIGS. 2(a) and 2(b), after the wire harness having an exposed portion of electrical wires is inserted into the heat-shrinkable tube or heat-shrinkable cap, the heat-shrinkable tube or heat-shrinkable cap is heated to the heat shrinkage temperature and heat-shrunk. FIG. 3(a) shows the state in which, after the wire harness having an exposed portion of electrical wires in the middle thereof has been inserted into the heat-shrinkable tube according to the second embodiment, the tube is heated and heat-shrunk. FIG. 3(b) shows the state in which, after the wire harness having an exposed portion of electrical wires at the end thereof has been inserted into the heat-shrinkable cap according to the second embodiment, the heat-shrinkable cap is heated and heat-shrunk.

The low-viscosity adhesive layer 2 is caused to flow and spread to fill the space 4 by heating and heat shrinking, but is prevented from flowing to the outside of the heat-shrinkable tube or cap and outflowing by the high-viscosity adhesive layer 3 which is not likely to deform even at the heat shrinkage temperature. (In FIGS. 3(a) and 3(b), reference sign 11 denotes a heat-shrinkable tube or cap after heat shrinking, and reference sign 21 denotes the low-viscosity adhesive layer after flowing.) Furthermore, since the low-viscosity adhesive layer 2 is formed of a resin having a viscosity of 10 Pa·s or less at a shear rate of 1 s$^{-1}$ at the heat shrinkage temperature, the resin penetrate the interstices between strands constituting the wire harness 6, and it is possible to achieve excellent water blocking ability between strands.

(Waterproof Method According to Third Embodiment)

A third embodiment of the present invention is a method of waterproofing an electrical wire bundle in which a plurality of electrical wires are bundled together, each electrical wire including a bundle of a plurality of strands covered with insulation, the method including a step of placing a heat-shrinkable tube or heat-shrinkable cap over an exposed portion of electrical wires of the electrical wire bundle, followed by heat-shrinking the heat-shrinkable tube or heat-shrinkable cap. The heat-shrinkable tube or heat-shrinkable cap includes an adhesive layer disposed on the inner surface thereof. The adhesive layer includes a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature, and a high-viscosity adhesive layer formed of a resin having a viscosity of 200 Pa·s or more at a shear rate of 1 s$^{-1}$ at the heat shrinkage temperature. In the case of the heat-shrinkable tube, the high-viscosity adhesive layer is provided on both sides of the low-viscosity adhesive layer, and in the case of the heat-shrinkable cap, the high-viscosity adhesive layer is provided at least on the heat-shrinkable cap opening side of the low-viscosity adhesive layer.

In the waterproof method according to the third embodiment, merely by an operation of placing a heat-shrinkable tube or heat-shrinkable cap over an exposed portion of electrical wires, followed by heating to heat-shrink the tube or cap, it is possible to achieve not only waterproofing of the exposed portion of electrical wires of the electrical wire bundle but also water blocking between strands. Furthermore, outflow (protrusion) of the resin during heat shrinking is suppressed. Therefore, this method can enhance productivity of the operation of waterproofing electrical wire bundles such as wire harnesses compared with the existing techniques and can be suitably used as a waterproof method for joints of wire harnesses for automobile use and the like.

The heat-shrinkable tube or heat-shrinkable cap used in the waterproof method according to the third embodiment is the heat-shrinkable tube or heat-shrinkable cap according to the second embodiment. In the waterproof method according to the third embodiment, first, the heat-shrinkable tube or heat-shrinkable cap is placed over an exposed portion of electrical wires of an electrical wire bundle.

The electrical wire bundle means a bundle of electrical wires, each electrical wire including a bundle of a plurality of strands covered with insulation. Examples of the electrical wire bundle to which this embodiment can be suitably applied include wire harnesses for automobile and motorcycle use, in particular, wire harnesses for automobile use. Accordingly, a preferred embodiment of the third embodiment provides a waterproof method in which the electrical wire bundle is a wire harness for automobile use.

The exposed portion of electrical wires of an electrical wire bundle is a connecting portion (joint) located at the end or middle of an electrical wire bundle, such as a wire harness, and is a portion where strands are exposed (portion to be waterproofed). In the waterproof method according to the third embodiment, first, the heat-shrinkable tube or heat-shrinkable cap is placed over an exposed portion of electrical wires, and then heated to the heat shrinkage temperature. When heated, the heat-shrinkable tube or heat-shrinkable cap heat-shrinks, and the adhesive constituting the low-viscosity adhesive layer (low-viscosity adhesive: inner-layer adhesive) flows to cover the bundle of insulated electrical wires at the exposed portion of electrical wires from the outside. When the adhesive is solidified by cooling after heat shrinking, waterproofing of the exposed portion of electrical wires is achieved. Furthermore, since the low-viscosity adhesive has a low viscosity of 10 Pa·s or less at the heat shrinkage temperature, the adhesive penetrates the interstices between strands. The viscosity of the low-viscosity adhesive that has penetrated the interstices between strands is increased by cooling after heat shrinking, and water blocking ability between strands is achieved. Thus, it is possible not only to perform waterproofing from the outside but also to prevent water that flows in the interior of the electrical wires from entering. In particular, in the case where the low-viscosity adhesive is composed of a thermoplastic resin whose viscosity changes markedly with temperature, the resin is solidified by cooling after heat shrinking, and thus, it is possible to achieve sufficient water blocking ability between strands.

EXPERIMENTAL EXAMPLES

[Materials Used in Experiments]

1. Heat-shrinkable cap: heat-shrinkable cap A 10/4×70 L (material: polyethylene, inside diameter before shrinkage: 10 mm, thickness before shrinkage: 0.65 mm, inside diameter after shrinkage: 4 mm, thickness after shrinkage: 1.5 mm, length: 70 mm)

2. Wire harness: obtained by joining 7 electrical wires by ultrasonic welding, each electrical wire being AVSS 0.5 (conductor: annealed copper stranded conductor, insulation: polyvinyl chloride, number of strands: 8, strand diameter: 0.32 mm, conductor cross-sectional area: 0.56 mm$^2$, manufactured by Sumitomo Wiring Systems, Ltd.)

3. Low-viscosity inner-layer adhesive (Polyamide resin)

A polyamide resin having a softening point of 65° C. was used, the softening point being determined by thermomechanical analysis (TMA) under the following conditions:

Instrument: TMA-50 (manufactured by SHIMAZU Corporation)

Atmosphere: nitrogen

Temperature: raised from 25° C. to 150° C. at 5° C./min

Indentation with a 0.5-mmϕ jig, load: 10 g

The polyamide resin had a viscosity of 9.4 Pa·s at a shear rate of 1 s$^{-1}$ at 150° C. and a viscosity of 338.2 Pa·s at a shear rate of 1 s$^{-1}$ at 125° C.

4. High-viscosity adhesive layer (dam material)

A polyethylene resin: Sumikathene L705 (manufactured by Sumitomo Chemical Co., Ltd.) was used.

The polyethylene resin had a viscosity of 3,530 Pa·s at a shear rate of 1 s$^{-1}$ at 150° C.

[Production of Heat-Shrinkable Cap]

A tube having an inside diameter of 8 mm, a thickness of 0.4 mm, and a length of 20 mm, which was produced using the polyamide resin, was inserted onto the inner surface of the heat-shrinkable cap to form a low-viscosity adhesive layer. Then, a tube having an inside diameter of 8 mm, a thickness of 0.4 mm, and a length of 10 mm, which was produced using the polyethylene resin, was inserted on the opening side of the low-viscosity adhesive layer (polyamide resin layer) to form a high-viscosity adhesive layer.

Experiment 1

An exposed portion of electrical wires located at an end of the wire harness was inserted into the heat-shrinkable cap obtained as described above, and then, heating was performed at 150° C. for 5 minutes to heat-shrink the heat-shrinkable cap. After cooling, the end was immersed in water, and compressed air of 0.2 MPa was injected from the other end of each of the seven electrical wires constituting the wire harness. In such a manner, an air leakage test (testing the presence or absence of air leakage: water blocking between strands) was conducted. Air leakage was not present. Furthermore, protrusion of the resin to the outside of the heat-shrinkable cap due to heat shrinking was not observed.

Experiment 2

A heat-shrinkable cap was obtained as in Experiment 1 except that a low-viscosity adhesive layer only was formed, and a high-viscosity adhesive layer was not formed. An exposed portion of electrical wires located at an end of the wire harness was inserted into the heat-shrinkable cap, and then, heating was performed to heat-shrink the heat-shrinkable cap as in Experiment 1. Protrusion of the resin to the outside of the heat-shrinkable cap due to heat shrinking was observed.

Experiment 3

A heat-shrinkable cap was produced as in Experiment 2 except that, instead of the polyamide resin, a polyamide resin having a viscosity of 47.5 Pa·s at a shear rate of 1 s$^{-1}$ at 150° C. was used. An exposed portion of electrical wires located at an end of the wire harness was inserted into the heat-shrinkable cap, and then, heating was performed to heat-shrink the heat-shrinkable cap. Subsequently, an air leakage test was conducted. Air leakage occurred.

REFERENCE SIGNS LIST 1 heat-shrinkable tube, heat-shrinkable cap (before heat shrinking)
2 low-viscosity adhesive layer
3 high-viscosity adhesive layer
4 space (between low-viscosity adhesive layer and high-viscosity adhesive layer)
5 exposed portion of electrical wires
6 wire harness

The invention claimed is:

1. A heat-shrinkable tube or heat-shrinkable cap comprising an adhesive layer disposed on the inner surface thereof, wherein the adhesive layer includes a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature.

2. The heat-shrinkable tube or heat-shrinkable cap according to claim 1, wherein the low-viscosity adhesive layer is composed mainly of a polyamide resin or ethylene-vinyl acetate copolymer resin that solidifies at a temperature lower than the heat shrinkage temperature.

3. The heat-shrinkable tube or heat-shrinkable cap according to claim 1, further comprising a dam material formed of a resin having a viscosity of 200 Pa·s or more at a shear rate of 1 s$^{-1}$ at the heat shrinkage temperature, wherein, in the case of the heat-shrinkable tube, the dam material is provided on both sides of the low-viscosity adhesive layer, and in the case of the heat-shrinkable cap, the dam material is provided at least on the heat-shrinkable cap opening side of the low-viscosity adhesive layer.

4. The heat-shrinkable tube or heat-shrinkable cap according to claim 3, wherein the dam material is formed of a resin composed mainly of a polyethylene resin or ethylene-vinyl acetate copolymer resin and having a viscosity of 400 Pa·s or more at a shear rate of 1 s$^{-1}$ at the heat shrinkage temperature.

5. A heat-shrinkable tube or heat-shrinkable cap comprising an adhesive layer disposed on the inner surface thereof, wherein the adhesive layer includes:

a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature, and a high-viscosity adhesive layer formed of a resin having a viscosity of 200 Pa·s or more at a shear rate of 1 s$^{-1}$ at the heat shrinkage temperature; and wherein, in the case of the heat-shrinkable tube, the high-viscosity adhesive layer is provided on both sides of the low-viscosity adhesive layer, and in the case of the heat-shrinkable cap, the high-viscosity adhesive layer is provided at least on the heat-shrinkable cap opening side of the low-viscosity adhesive layer.

6. The heat-shrinkable tube or heat-shrinkable cap according to claim 5, wherein the high-viscosity adhesive layer is formed of a resin composed mainly of a polyethylene resin or ethylene-vinyl acetate copolymer resin and having a viscosity of 400 Pa·s or more at a shear rate of 1 s$^{-1}$ at the heat shrinkage temperature.

7. A method of waterproofing an electrical wire bundle in which a plurality of electrical wires are bundled together, each electrical wire including a bundle of a plurality of strands covered with insulation, the method comprising a step of placing a heat-shrinkable tube or heat-shrinkable cap over an exposed portion of electrical wires of the electrical wire bundle, followed by heat-shrinking the heat-shrinkable tube or heat-shrinkable cap, wherein the heat-shrinkable tube or heat-shrinkable cap includes an adhesive layer disposed on the inner surface thereof;

wherein the adhesive layer includes:

a low-viscosity adhesive layer formed of a resin having a viscosity of 10 Pa·s or less at a shear rate of 1 s$^{-1}$ at the heat shrinkage temperature and a viscosity of 100 Pa·s or more at a shear rate of 1 s$^{-1}$ at the maximum continuous use temperature, and a high-viscosity adhesive layer formed of a resin having a viscosity of 200 Pa·s or more at a shear rate of 1 s$^{-1}$ at the heat shrinkage temperature; and wherein, in the case of the heat-shrinkable tube, the high-viscosity adhesive layer is provided on both sides of the low-viscosity adhesive layer, and in the case of the heat-shrinkable cap, the high-viscosity adhesive layer is provided at least on the heat-shrinkable cap opening side of the low-viscosity adhesive layer.

8. The method of waterproofing an electrical wire bundle according to claim 7, wherein the electrical wire bundle is a wire harness for automobile use.

\* \* \* \* \*